US009055563B2

(12) United States Patent
Tan et al.

(10) Patent No.: US 9,055,563 B2
(45) Date of Patent: *Jun. 9, 2015

(54) SERVICE IN WLAN INTER-WORKING, ADDRESS MANAGEMENT SYSTEM, AND METHOD

(71) Applicant: Wi-Fi One, LLC, Plano, TX (US)

(72) Inventors: Pek-Yew Tan, Singapore (SG); Hong Cheng, Singapore (SG); Chee Bing Tan, WA (AU)

(73) Assignee: Wi-Fi One, LLC, Plano, TX (US)

( * ) Notice: Subject to any disclaimer, the term of this patent is extended or adjusted under 35 U.S.C. 154(b) by 80 days.

This patent is subject to a terminal disclaimer.

(21) Appl. No.: 13/737,366

(22) Filed: Jan. 9, 2013

(65) Prior Publication Data

US 2013/0121292 A1  May 16, 2013

Related U.S. Application Data

(63) Continuation of application No. 13/292,874, filed on Nov. 9, 2011, now Pat. No. 8,374,580, which is a continuation of application No. 12/559,468, filed on Sep. 14, 2009, now Pat. No. 8,081,971, which is a continuation of application No. 10/541,447, filed as application No. PCT/JP2004/000176 on Jan. 14, 2004, now Pat. No. 7,610,038.

(30) Foreign Application Priority Data

Jan. 14, 2003  (JP) ................................. 2003-006175

(51) Int. Cl.
*H04W 4/00* (2009.01)
*H04W 72/04* (2009.01)
(Continued)

(52) U.S. Cl.
CPC ......... *H04W 72/04* (2013.01); *H04L 29/12311* (2013.01); *H04L 61/2084* (2013.01);
(Continued)

(58) Field of Classification Search
CPC ... H04W 12/06; H04W 76/022; H04W 76/02; H04L 63/0272; H04L 12/4633
USPC ............... 455/432.3, 410, 411, 450; 370/310, 370/338, 395.5, 395.52; 709/230, 238
See application file for complete search history.

(56) References Cited

U.S. PATENT DOCUMENTS 5,751,967 A    5/1998  Raab et al.
6,061,650 A    5/2000  Malkin et al.
(Continued)

FOREIGN PATENT DOCUMENTS

EP    0 938 217 A2   8/1999
JP    9-55762 A      2/1997
(Continued)

OTHER PUBLICATIONS

"3rd Generation Partnership Project; Technical Specification Group Core Network; General Packet Radio Service (GPRS); GPRS Tunnelling Protocol (GTP) Across the Gn and Gp Interface (Release 5)," Technical Specification 3GPP TS 29.060 (V5.3.0), Sep. 2002, 99 pages.
(Continued)

*Primary Examiner* — Sonny Trinh
(74) *Attorney, Agent, or Firm* — Nixon & Vanderhye P.C.

(57) ABSTRACT

An address management method is provided, for use when a mobile terminal accesses a service from a WLAN access network, wherein the service is provided in a 3GPP network or in a service provider network via the 3GPP network. First, the mobile terminal connects to the WLAN access network. Second, the mobile terminal sends a tunnel setup request message from the WLAN access network to a network entity located in the 3GPP network, wherein the tunnel setup request message includes a service request identifier for accessing a requested service and a mobile terminal identifier. Third, the network entity receives the tunnel setup request message, and allocates an address for use by the mobile terminal to access the requested service based on the service request identifier and the mobile terminal identifier.

11 Claims, 9 Drawing Sheets

(51) Int. Cl.
H04L 29/12 (2006.01)
H04L 29/06 (2006.01)
H04W 8/26 (2009.01)
H04W 12/08 (2009.01)
H04L 12/46 (2006.01)
H04W 12/02 (2009.01)
H04W 12/06 (2009.01)
H04W 74/00 (2009.01)
H04W 84/12 (2009.01)

(52) U.S. Cl.
CPC ............ *H04L63/0428* (2013.01); *H04W 8/26* (2013.01); *H04W 12/02* (2013.01); *H04W 12/06* (2013.01); *H04W 12/08* (2013.01); *H04W 74/00* (2013.01); *H04W 84/12* (2013.01); *H04L 12/4633* (2013.01)

(56) References Cited

U.S. PATENT DOCUMENTS

| | | | |
|---|---|---|---|
| 6,079,020 | A | 6/2000 | Liu |
| 6,092,200 | A | 7/2000 | Muniyappa et al. |
| 6,226,751 | B1 | 5/2001 | Arrow et al. |
| 6,480,717 | B1 | 11/2002 | Ramaswamy |
| 6,522,880 | B1 | 2/2003 | Verma et al. |
| 6,765,591 | B2 | 7/2004 | Poisson et al. |
| 6,978,128 | B1 | 12/2005 | Raman et al. |
| 7,155,526 | B2 | 12/2006 | Chaudhary et al. |
| 7,272,397 | B2 | 9/2007 | Gallagher et al. |
| 7,283,822 | B2 | 10/2007 | Gallagher et al. |
| 7,301,922 | B1 | 11/2007 | Bhalla et al. |
| 7,324,483 | B2 | 1/2008 | Lee |
| 7,373,661 | B2 | 5/2008 | Smith et al. |
| 7,489,659 | B2 | 2/2009 | Siorpaes et al. |
| 7,882,247 | B2 * | 2/2011 | Sturniolo et al. ............. 709/228 |
| 8,023,492 | B2 * | 9/2011 | Faccin .......................... 370/349 |
| 8,031,672 | B2 * | 10/2011 | Balaji et al. ................... 370/331 |
| 8,238,326 | B2 * | 8/2012 | Kant et al. ..................... 370/352 |
| 2005/0181764 | A1 | 8/2005 | Hahn et al. |
| 2006/0104262 | A1 | 5/2006 | Kant et al. |
| 2006/0209768 | A1 * | 9/2006 | Yan et al. ....................... 370/338 |
| 2007/0274266 | A1 | 11/2007 | Oyama et al. |
| 2008/0037481 | A1 * | 2/2008 | Chiang et al. ................. 370/338 |
| 2008/0130637 | A1 | 6/2008 | Kant et al. |
| 2008/0219230 | A1 | 9/2008 | Lee et al. |
| 2013/0031615 | A1 * | 1/2013 | Woodward et al. ............... 726/4 |

FOREIGN PATENT DOCUMENTS

| | | |
|---|---|---|
| JP | 10-32610 A | 2/1998 |
| JP | 2002-94546 A | 3/2002 |
| KR | 2002-0084828 A | 11/2002 |
| WO | 02/077820 A1 | 10/2001 |
| WO | 02/087160 A2 | 10/2002 |
| WO | 2010/064801 A2 | 6/2010 |

OTHER PUBLICATIONS

"3rd Generation Partnership Project; Technical Specification Group Core Network; Numbering, Addressing and Identification (Release 5)," Technical Specification 3GPP TS 23.003 (V5.3.0), Jun. 2002, 36 pages.
"3rd Generation Partnership Project; Technical Specification Group Services and System Aspects; 3rd Generation Mobile System Release 4 Specifications (Release 4)," Technical Specification 3GPP TS 21.102 (V4.6.0), Sep. 2002, 15 pages.
"3rd Generation Partnership Project; Technical Specification Group Services and System Aspects; General Packet Radio Service (GPRS); Service Description; Stage 2 (Release 5)," Technical Specification 3GPP TS 23.060 (V5.2.0), Jun. 2002, 199 pages.
"3rd Generation Partnership Project; Technical Specification Group Services and System Aspects; IP Multimedia Subsystem (IMS); Stage 2 (Release 5)," Technical Specification 3GPP TS 23.228 (V5.6.0), Sep. 2002, 126 pages.
Aboba et al., "The Network Access Identifier," RFC 2486, The Internet Society, Jan. 1999, 9 pages.
Blunk et al., "PPP Extensible Authentication Protocol (EAP)," RFC 2284, The Internet Society, Mar. 1998, 16 pages.
Calhoun et al., "Diameter Base Protocol," Internet Draft, The Internet Society, Oct. 2002, 147 pages.
Calhoun et al., "Diameter NASREQ Application," Internet Draft, The Internet Society, Mar. 2002, 61 pages.
Droms (ed.) et al., "Dynamic Host Configuration Protocol for IPv6 (DHCPv6)," Internet Draft, The Internet Society, Nov. 2, 2002, 94 pages.
Faccin et al., "Diameter Mobile IPv6 Application," Internet Draft, The Internet Society, Sep. 2002, 36 pages.
Hiller et al., "Diameter Extensible Authentication Protocol (EAP) Application," Internet Draft, The Internet Society, Jun. 2002, 15 pages.
Johnson et al., "Mobility Support for IPv6," Internet Draft, The Internet Society, Oct. 29, 2002, 154 pages.
Perkins (ed.), "IP Mobility Support for IPv4," RFC 3344, The Internet Society, Aug. 2002, 100 pages.
"Port-Based Network Access Control," IEEE Standard for Local and Metropolitan Area Networks, IEEE STD 8021X-2001, Jul. 13, 2001, 142 pages.
Salsano et al., "SIP Security Issues: The SIP Authentication Procedure and Its Processing Load," IEEE Network, Nov./Dec. 2002, pp. 38-44.
"SC.R2001-001 v1.0: 3GPP2 System Capability Guide—Release A," 3rd Generation Partnership Project 2 ("3GPP2"), Jun. 23, 2006, 52 pages.
Substantive Examination Report mailed Sep. 18, 2009, issued in corresponding Korean Application No. 10-2005-7012955.
Thomson et al., "IPv6 Stateless Address Autoconfiguration," RFC-2462, The Internet Society, Dec. 1998, 26 pages.
International Search Report, mailed Apr. 13, 2004, issued in corresponding International Application No. PCT/JP2004/000176, filed Jan. 14, 2004.
Ex Parte Quayle Office Action mailed Mar. 10, 2009, from U.S. Appl. No. 10/541,447, filed Apr. 7, 2006.
Notice of Allowance mailed Jul. 31, 2009, from U.S. Appl. No. 10/5471,447, filed Apr. 7, 2006.
Canadian Office Action, dated Sep. 28, 2011, from corresponding Canadian Application No. 2,512,959, 2 pages.
Supplementary European Search Report, mailed Nov. 30, 2011, for corresponding European Patent Application 04702063, 3 pages.
Canadian Office Action, dated May 9, 2012, for corresponding Canadian Application No. 2,512,959, 3 pages.
Extended European Search Report, mailed Sep. 17, 2012, for European Patent Application No. 12170887.9, 9 pages.
Rigney et al., "Remote Authentication Dial in User Service (RADIUS)," Network Working Group, Jun. 2000, 78 pages.
Indian Office Action dated Mar. 25, 2015 in IN 3234/DELNP/2005, 2 pages.

\* cited by examiner

FIG. 3

| Message_Type (301) |
|---|
| Message_Length (302) |
| Domain_Name (303) |
| MT_ID (304) |
| Service_Request (305) |
| Session_ID (306) |
| Address_Request (307) |
| Tunnel_Request (308) |
| WLAN_ID (309) |
| Security_Field (310) |

SERVICE IN WLAN INTER-WORKING, ADDRESS MANAGEMENT SYSTEM, AND METHOD

CROSS-REFERENCES TO RELATED APPLICATIONS

This application is a continuation of U.S. application Ser. No. 13/292,874 filed Nov. 9, 2011, which is a continuation of U.S. application Ser. No. 12/559,468 filed Sep. 14, 2009, which is a continuation of U.S. application Ser. No. 10/541,447 filed Apr. 7, 2006, which is the National Stage of International Application No. PCT/JP2004/000176, filed Jan. 14, 2004, which claims priority to JPSN 2003-006175, filed Jan. 14, 2003.

TECHNICAL FIELD

The invention pertains to the field of wireless data communication. More particularly, this invention relates to the address management in the wireless LAN (WLAN) environment for the mobile user to come from other networks. It could be used for the inter-working of the WLAN to the public radio networks, e.g. 3G networks, or WLANs using other radio technologies or in another administrative domain. The invention is used by the WLAN and the inter-worked network as well as the mobile terminal, for the address allocation, configuration, tunnelling set-up, etc, so that the mobile terminal is able to access services it subscribed to in the WLAN.

BACKGROUND

In WLAN inter-working, the terminal needs to be addressable so that it can access any service it subscribed to. When the services are delivered over IP, the terminal must be attached to a certain IP address. In the mobile world, the point of attachment of the terminal changes frequently. It is highly possible that the terminal traverses a few domains during one active service session. To satisfy the requirements of terminal mobility, the address management mechanism is needed to configure and update the terminal's address every time it changes the point of attachment.

Mobile IP is an open standard, defined by the Internet Engineering Task Force (IETF) (non-patent reference 1) (non-patent reference 2), that provide a solution for the address management and traffic routing for the mobile terminals. It allows the user to remain reachable using the same address when roaming among different IP networks. Since the mobility is controlled at the IP level, it is not bound to the under lying link layer technologies. Therefore, for terminals in the 3G cellular networks, or the Wireless LAN (e.g. 802.11 networks), same protocol stack could apply. With the merging of the access technologies, e.g. the inter-working of the WLAN and 3G cellular networks, this kind of harmonized level solution is especially useful. In MobileIP, the address management is done over the IP connectivity. In case the IP connectivity is not available, it could not work. MobileIP also requires the terminal to own a Home Address, and know its Home Agent. This might not be available in the inter-working scenarios, e.g. when the terminal powers up in the foreign WLAN for the first time.

Mobile IPv6 draft has introduced a way of setting the home address of the mobile node (non-patent reference 2). The terminal would generate a care of address first, e.g. utilizing DHCPv6 (non-patent reference 3), and use this address to communicate with its home network to set up the final home address. In WLAN inter-working, this is not workable, since the mobile node's home network may not be always reachable using the care of address obtained from the WLAN. Also, the multiple round-trip configuration procedure would be time consuming, and could not meet the expectation of the users.

The Diameter Mobile IPv6 Application (non-patent reference 4) has presented a solution based on the AAA architecture for the address management for the Mobile IPv6. This solution has utilized the AAA servers and clients in the visited and home network to carry out the address updating and agent discovery. The mechanism requires the mobile node to have local IP connectivity for the message exchange, e.g. able to listen for the Router Advertisement messages, and this is not always possible due to the foreign domain's local policy. Also, the scheme only caters for the situation where the address belongs to the mobile terminal's home domain. In the WLAN inter-working, the terminal would use address from another domain depending on the service it's accessing. This could not be supported in the scheme since it has not information of the service request of the terminal. This scheme is designed for the Mobile IPv6 environment, and therefore could not work with terminals with no Mobile IP stack.

3GPP also has provided a solution, GTP (non-patent reference 5) for managing the terminal addressing and tunnelling. GTP comprises two parts, GTP-C for control and GTP-U for user data traffic. GTP runs over UDP, and encapsulates the user data in the UDP packets. The GTP is designed for the GPRS (non-patent reference 6) network, and therefore depends heavily on the GPRS network's features, e.g. GGSN, SGSN nodes. This makes it difficult to be deployed in the simple wireless access network (e.g. WLAN).

(Non-patent reference 1) "IP Mobility Support for IPv4" www.ietf.org/rfc/rfc3344.txt
(Non-patent reference 2) "Mobility Support in IPv6" www.ietf.org/internet-drafts/draft-ietf-mobileip-ipv6-19.txt
(Non-patent reference 3) "Dynamic Host Configuration Protocol for IPv6 (DHCPv6)" www.ietf.org/internet-drafts/draft-ietf-dhc-dhcpv6-28.txt
(Non-patent reference 4) "Diameter Mobile IPv6 Application" www.ietf.org/internet-drafts/draft-le-aaa-diameter-mobileipv-6-02.txt
(Non-patent reference 5) "GPRS Tunnelling Protocol (GTP) Across the Gn and Gp Interface (Release 5)" 3GPP TS 29.060 V5.3.0 (2002-09) tp.3gpp.org/Specs/archive/29_series/
(Non-patent reference 6) "General Packet Radio Service (GPRS); Service Description; Stage 2 (Release 5)" 3GPP TS 23.060 V5.2.0 (2002-06) ftp.3gpp.org/Specs/archive/23_series/
(Non-patent reference 7) "IP Multimedia Subsystem (IMS); Stage 2 (Release 5)" 3GPP TS 23.228 V5.6.0 (2002-09) ftp.3gpp.org/Specs/archive/23_series/
(Non-patent reference 8) "Diameter Base Protocol" www.ietf.org/internet-drafts/draft-ietf-aaa-diameter-15.txt
(Non-patent reference 9) "PPP Extensible Authentication Protocol (EAP)" www.ietf.org/rfc/rfc2284.txt
(Non-patent reference 10) 3GPP Project www.3gpp.org
(Non-patent reference 11) 3GPP2 Project www.3gpp2.org (Non-patent reference 12) "The Network Access Identifier"
www.ietf.org/rfc/rfc2486.txt
(Non-patent reference 13) "Numbering, addressing and identification (Release 5)" 3GPP TS 23.003 V5.3.0 (2002-06)
ftp.3gpp.org/Sepcs/archive/23_series/
(Non-patent reference 14) "Port-Based Network Access Control" IEEE Std 802.1x-2001
standards.ieee.org/getieee802/
(Non-patent reference 15) "Diameter Extensible Authentication Protocol (EAP) Application"
www.ietf.org/internet-drafts/draft-ietf-aaa-eap-00.txt
(Non-patent reference 16) "Diameter NASREQ Application"
www.ietf.org/internet-drafts/draft-ietf-aaa-diameter-nasreq-09.txt
(Non-patent reference 17) "IPv6 Stateless Address Autoconfiguration"
www.ietf.org/rfc/rfc2462.txt Usually WLAN and the inter-worked network are in different administrative domains, which means their address spaces are managed separately. Therefore, when a mobile terminal roams into a WLAN in a different domain than its home network, some address configuration must be carried out to guarantee the continuous service delivery to the terminal. This address configuration could include for example IP address allocation, address registration, tunnelling set-up, etc.

For certain services delivered to the terminal over the WLAN, address restrictions would apply. For example, to access the IMS (non-patent reference 7) service in the 3G networks from the WLAN would require the terminal to own an address belonging to the network providing the IMS. Consequently, a mobile terminal with parallel access to different services would be required to have multiple IP address configured.

In WLAN, terminals are not allowed to use any resources, e.g. send or receive normal data packets, before they are authenticated, and authorized to do so. Using normal schemes, e.g. the one suggested in MIPv6, the address configuration could only happen after the successful authorization procedures. This kind of approach is slow, and is not able to meet requirements of some of the services. In order to have the address configured before the authorization, relevant information needs to be integrated into the access control messages. The address management is usually based on the user's subscription information. Therefore, it must be controlled by the mobile terminal's home network. For certain external services, the address needs to be allocated from domain other than the home network. In this case, a mechanism is required to allow the home network to negotiate the address allocation, and other information with that domain.

When a terminal changes its address, the end-to-end QoS associated to it would be affected. For example, a traffic filter based on source or destination address information would not be able to correctly classify the streams if the address changed. For a WLAN that implements firewall or other traffic control functions, the terminal's new address also needs to be signalled, otherwise traffic could be blocked or dropped.

SUMMARY

When a terminal enters a WLAN, it must go through the authentication, authorization procedures to gain access to the resources. In this invention, a solution is presented for address management that is integrated into the access control mechanisms. By this integration, the terminal's address could be configured together with the granting of access. The terminal would reuse and extend the access control mechanisms, and therefore does not need to implement any new protocol. The configuration process would be shielded by the inherent encryption and protection of the access control process, and thus need no extra security setup.

The present invention also provides means for the terminal's home network to negotiate the address management with the network that provides the service to the terminal. This kind of negotiation is a back-end process, and is transparent to the mobile terminal and WLAN. Result of the negotiation would be carried along to the WLAN and mobile terminal using the service authorization procedures.

When parallel access sessions are present to the same terminal, multiple addresses could be required. The invention provides a method for the terminal to obtain address that binds to the session, using a fine grain service authorization procedure. Each session would use the address attached to it, and transition to a new address is allowed.

The address management is also integrated with the policy control mechanisms. The policy control would provide means for the terminal and its home network to configure the WLAN when necessary after an address alternation. QoS, or tunnelling information would be modified and provisioned according to the new status using channels available in the existing policy control procedures. By this, a smooth address transition in the roaming time could be achieved, and QoS interruption could be minimized.

BRIEF DESCRIPTION OF THE DRAWINGS

FIG. 3 is a data structure diagram showing an example of the message structure used by the Mobile Terminal in the message exchanges shown in FIG. 2;

DETAILED DESCRIPTION

Figure 1:
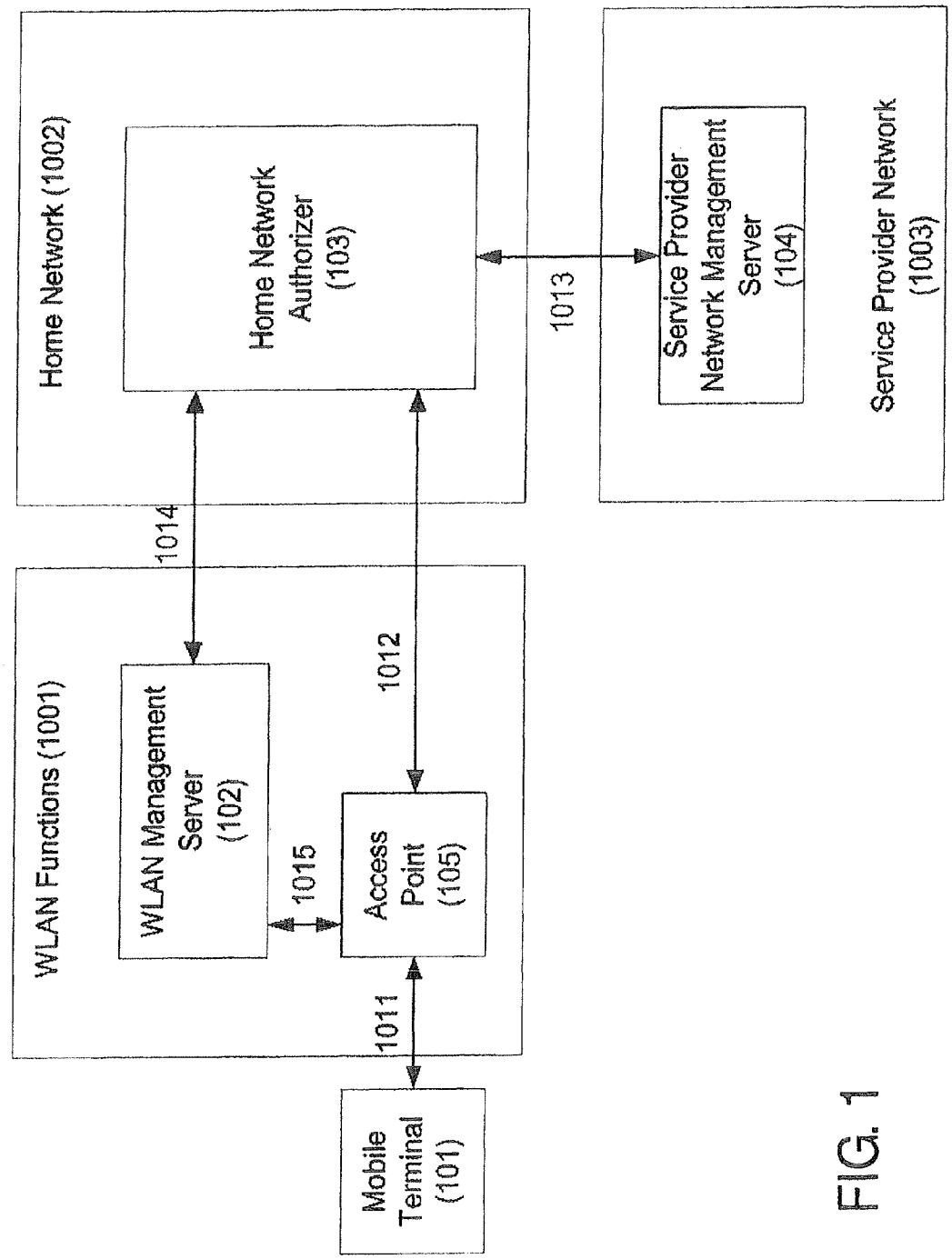
FIG. 1 is a block diagram showing an example of the network architecture that is used for managing the address allocation for the mobile terminal, tunnelling setup and service negotiation in the WLAN inter-working in the present invention.

The present invention is to be used for the WLAN to inter-work with other networks. The inter-worked network could be another WLAN or a public cellular network. It is easy to deploy the invention in both of the cases. The invention is to be used for the purpose of address management and service provisioning relevant to the address transition (i.e. mobility control).

The deployment of the proposed scheme, no extra interface and protocol implementation are necessary. The scheme would reuse the existing access control mechanisms, and extend some of the attributions to support the necessary functionalities. The address allocation and modification would be integrated with the service authorization procedures. Since the authorization procedure is encrypted and protected by the credentials obtained from the authentication, the address information is also protected with same level of security. It would be shown as part of the authorization information, and could be transferred the same way as normal authorization information.

For example, it could be included in the Diameter (non-patent reference 8) as an authorization specific AVP, or an EAP (non-patent reference 9) attribute if an EAP method for authorization is available.

When a terminal enters the WLAN, it would be authenticated and authorized before allowed to use the service. In the authorization procedure, the terminal would request for the service it tends to access. This information would be passed back to the terminal's home network by the WLAN. The terminal's home network decides whether to allow the service based on the user's subscription profile. Depending on the service requested, the terminal's home network also decides the address to be used for the service. For example, for an IMS service, the address needs to be allocated from the IMS address space, whilst for a local WLAN service, the address obtained locally would be sufficient. Also, tunnelling information related to the address management would be identified.

The address information would be included in the authorization information, and sent along with the authorization success message. Part of the information is destined for the WLAN, and part for the terminal, similar to the normal authorization procedure. For example, the address needs to be sent to the terminal so that it can configure itself, and the tunnelling information would be used by the WLAN if network tunnelling were necessary.

When any change in address is necessary, the re-authorization procedure could be used for a quick update without going through the service authorization details.

Policy control would be triggered when the terminal starts to access the service. Address information would be made available to the policy server at the terminal's home network. The policy server could then make policy decisions based on the address information. When address changes, the policy server would be notified to update the corresponding policies, so that the QoS and service provisioning could be guaranteed.

To help understanding the invention, the following definitions are used.

A "WLAN" refers to wireless local area network. It contains arbitrary number of devices in order to provide LAN services to mobile terminals through wireless technologies.

A "3G network" refers to a $3^{rd}$ generation public access network. An example could be the system defined by 3GPP (non-patent reference 10), or 3GPP2 (non-patent reference 11).

A "Mobile Terminal" refers to a device used for accessing the service provided by the WLAN and other networks through wireless technologies.

A "Home Network" refers to the network where the Mobile Terminal (MT)'s service subscription information stored. In the inter-working scenarios, it could be the network the MT originally subscribed to, or a visited network that is authorized to have full access to the MT's subscription information.

A "Service Provider Network" refers to the network where the service the MT requested is provided. It could be any network, e.g. the home network, the WLAN, or an external network.

A "Network Element" refers to any functioning device in the network that can carry out information processing.

A "Policy Server" refers to a network element that performs the policy control function of the network domain. The policy control function includes, for example, the local resource allocation, packet filter updating, routing updating, etc.

An "Air Interface" refers to any radio access technologies for the mobile terminal to access the WLAN.

A "stream" is a gathering of packets transferred in the network that have certain attributes in common.

A "Traffic" is a gathering of streams transferred in the network.

A "flow" refers to the data path and the network resources needed for the data path used in delivering the stream.

"QoS" refers to the term Quality of Service of a data streams or traffic.

"Message" refers to the information exchanged between the Network Elements for the purpose of Inter-working control.

"Operation Sequence" refers to a series of Message Exchange between certain Network Elements in certain order for Inter-working control.

"Upper Layer" refers to any entity on top of the current entity that processes the packet passed to it from the current entity.

"Client Based Tunnel" refers to the tunnelling scheme that one of the end points of the tunnel is the Mobile Terminal.

"Network Based Tunnel" refers to the tunnelling scheme that the end points of the tunnel reside on Network Elements other than the Mobile Terminal.

In the following description, for purposes of explanation, specific numbers, times, structures, protocol names, and other parameters are set forth in order to provide a thorough understanding of the present invention. However, it will be apparent to anyone skilled in the art that the presented invention may be practiced without these specific details. In other instances, well-known components and modules are shown in block diagram in order not to obscure the present invention unnecessary.

Due to the highly mobile characteristics of the terminal, mobility control is one of the most prominent issues for WLAN inter-working. When a terminal moves, it could be forced to use an address that is not local to its point of attachment. For example, for a 3G terminal roamed into the WLAN, it needs a 3G-domain address to access its home network's service, e.g. IMS service. When the terminal initiates the service inside the 3G networks, the address is allocated according to 3G schemes, e.g. GPRS service (non-patent reference 6). This address would be bound to the terminal's 3G cellular interface. When a terminal enters the WLAN domain, it could desire to communicate using its WLAN interface since that can provide higher throughput. For example, a PDA with dual interface, GPRS and IEEE802.11, would desire to use its GPRS interface on the road, and use its IEEE802.11 interface in the hotspot. When using the WLAN interface accessing the 3G service, the terminal needs to continue using the same address obtained from the 3G interface. Otherwise, the terminal would face service interruption, and be forced to re-initiate the session, which is not desirable to the user. Since the address in use is not local to the WLAN, a tunnel must be set up from the terminal to the Service Provider Network.

An example implementation of the invention for address allocation and tunnel set-up is shown in FIG. 1. To avoid confusion, only Network Entities that participate in the signaling are shown.

The Mobile Terminal (101) is the entity that requests a certain service from the network. In real world, it could comprise several entities, e.g. a handset connected to the laptop computer via a Bluetooth link. It is drawn as one set in FIG. 1 for the reason of simplicity. Among the WLAN Functions (1001), the Access Point (105) is the entity that provides WLAN access to the Mobile Terminal (101). Access Point (105) would block all the data traffic from the Mobile Terminal (101) until it is authorized to use the WLAN services. A control channel that only allows certain specific data packets is left open for the access control signaling. Mobile Terminal (101) communicates with the Access Point (105) over the wireless link (1011). This link could use any kind of wireless technology, e.g. IEEE802.11, HiperLAN/2, Infrared, etc. This does not preclude the use of other technologies, e.g. Optical Fiber, for this link, if similar access control technology could apply. Another entity in the WLAN is the WLAN Management Server (WLAN Server) (102). This WLAN Server (102) is in charge of the address space management, and resource management of the WLAN. It could reside on the WLAN gateway, or, in a simple WLAN, even collocate with the Access Point (105). The WLAN Server (102) communicates with Access Point (105) over interface (1015). This is for WLAN resource control and service provisioning, e.g. QoS management over air interface. To manage the WLAN, the server could interact with other entities of the WLAN, e.g. the WLAN gateway or Firewall, which is not shown in the diagram.

In the terminal's Home Network (1002), a Home Network Authorizer (103) controls the service authorization and address allocation. The Access Point (105) and WLAN Server (102) both communicate with the Home Network Authorizer (103) for service control information via links (1012) and (1014). Physically, these links could be identical, i.e. between same end points, using the same protocol, and encapsulated in the same packet, but they are logically separated.

The Mobile Terminal (101) could request for any service it subscribed to. These services could be in the Home Network (1002), a separate Service Provider Network (1003), or even the WLAN itself. When the service is provided by the Home Network (1002) or the WLAN, the Service Provider Network (1003) would overlap with these networks, and thus the control functions could bind together. The Service Provider Network Management Server (Service Provider Network Server) (104) controls the service authorization, and address allocation in the Service Provider Network (1003). The Home Network Authorizer (103) communicates with Service Provider Network Server (104) over a control interface (1013). In real implementation, the Service Provider Network (1003) could be the WLAN, the Home Network (1002) or another network.

In case the service is provided in the Home Network (1002), this interface becomes an internal interface, and does not need to follow the exact format and using the same protocol as described in the following example implementation.

Figure 2:
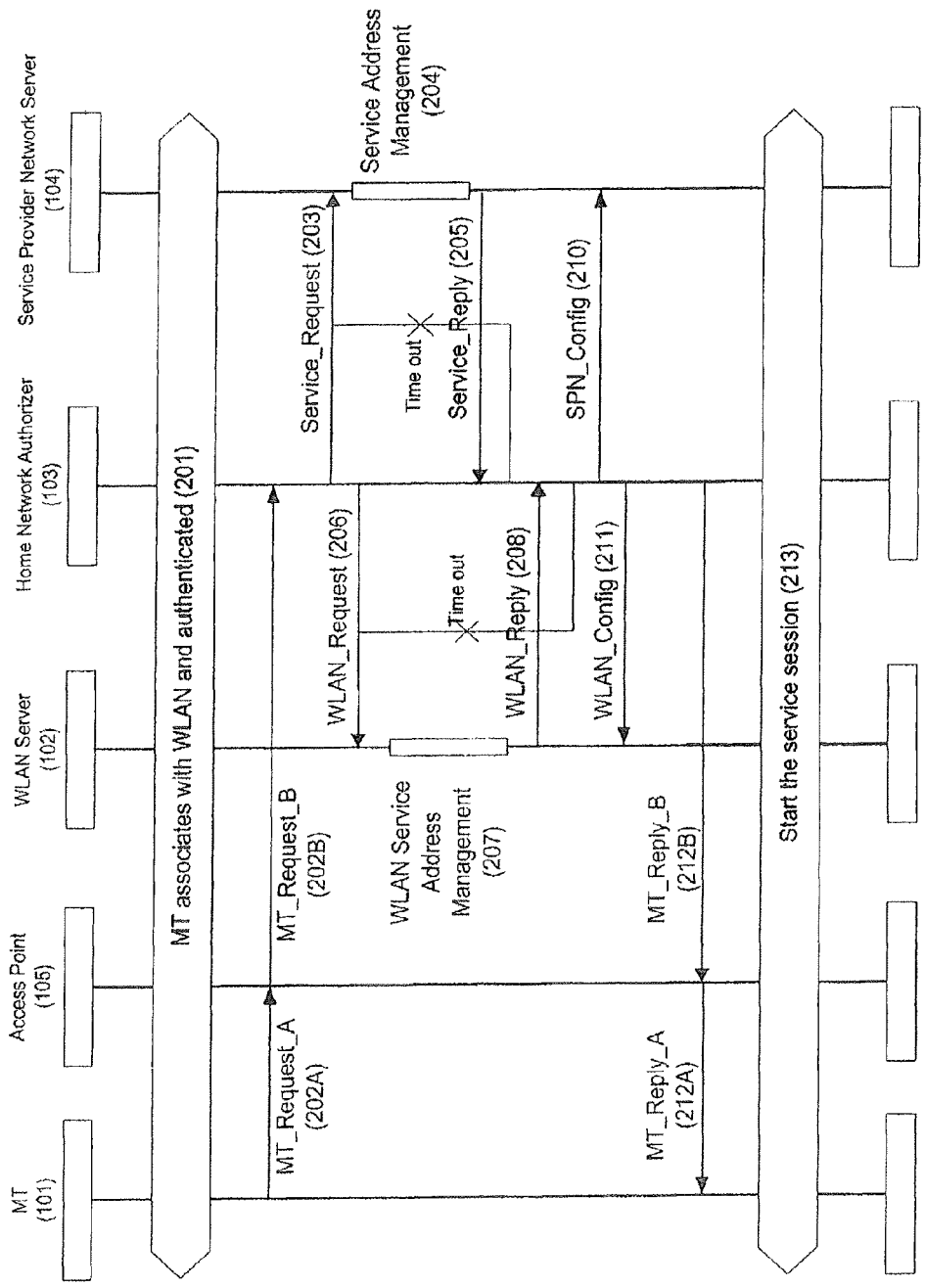
FIG. 2 is a sequence diagram showing an example of the message sequence for the address allocation for the Mobile Terminal, tunnelling setup and service negotiation in the network architecture shown in FIG. 1.

FIG. 2 shows an example operation sequence for the address management for the WLAN inter-working using the above-described framework. In the operation, it is assumed that the Mobile Terminal (MT) (101) has already finished the WLAN association and authentication procedure (201). This means that the Mobile Terminal (101), and the Access Point (105) has already mutually authenticated each other, and encryption protection has already been turned on for the following message exchanges. When the Mobile Terminal (101) wants to access any service over the WLAN, it sends out the MT_Request_A message (202A), over the link (1011) to the Access Point (105) and destined to its Home Network Authorizer (103). This message is end-to-end protected by the keys generated from the authentication procedures (201). FIG. 3 shows an example implementation of the MT_Request_A message (202A).

The message starts with the Message_Type field (301). This field identifies which kind of message is encapsulated, e.g. Request, Reply, etc. The length of this field is one octet. Message types are represented by integer numbers. This is to save the limited resources for signaling over the air interface. It is obvious to anyone skilled in the art that this field could adopt any other format when necessary. Following the Message_Type field (301) is the Message_Length field (302). It contains the information about the length of the whole message, including the Message_Type field (301). Next field is the Domain_Name field (303). This field identifies the home domain of the Mobile Terminal (101). The Network Access Identifier (NAI) (no-patent reference 12) could be used, and it would be in the form of, for example, "UserID@home.domain.3gpp.org". To protect the user identity, the UserID part before the "@" sign is using a wildcard value, e.g. "roamed". The home domain information is used for routing the message to the Mobile Terminal (101)'s Home Network Authorizer (103).

The above three fields, Message_Type field (301), Message_Length field (302) and Domain_Name field (303), are protected by the security association between the Mobile Terminal (101) and the Access Point (105). This security association is obtained from the Authentication procedure (201) for the protection of air interface. Therefore, the information contained in these fields could be accessed by the Access Point (105) for forwarding purpose. The fields following the Domain_Name field (303) would be protected by the security association between the Mobile Terminal (101) and Home Network Authorizer (103). For example, it could be the public key of the Home Network Authorizer (103), or the session key derived from Authentication procedure (201). The UserID part from the Domain_Name field (303) could be used to signal the index of the keys that is used for the message protection.

After the Domain_Name field (303) is the MT_ID field (304). This field contains the information to uniquely identify the Mobile Terminal (101) in the Home Network (1002) context. This could be, for example, the IMSI (non-patent reference 13) of the Mobile Terminal (101), or the TMSI (non-patent reference 13) gained in the authentication procedures. The Home Network Authorizer (103) uses this identifier to retrieve the user's subscription information. It is obvious to anyone skilled in the art that any other format could be used in this field as long as the Home Network Authorizer (103) could map it to the actual user identity.

The next field is the Service-Request field (305). This field is used by the Mobile Terminal (101) to indicate the service it desires to access to the Home Network Authorizer (103). Since the message is between the Mobile Terminal (101) and its Home Network Authorizer (103), it is operator and network specific. For example, in a 3GPP network, this could be the APN (non-patent reference 13) that identifies the GGSN to use and the special service to access. It is obvious to anyone skilled in the art that other formats could be used if the Home Network (1002) is of another type. Other service request information could also be appended, e.g. the bandwidth request. A possible value of the field could be "2M.bandwidth.request.IMS.foo.bar.operator-name.operator-group.gprs". The part after the "request" is the standard APN to identify the service, and the part before the "request" is the specific service request. The actual request attribute is service dependent, and could be defined by the operator. The Mobile Terminal (101) could gains the knowledge of the format from the SIM or USIM card.

A Session_ID field (306) provides the session control information. This is used for the Mobile_Terminal (101) to identify the session this service request concerned to the Home Network Authorizer (103). The identifier of the session should be locally unique within the Mobile_Terminal (101). The Mobile Terminal (101) should maintain a local record of all the service sessions. A new entry with a new session identifier would be created whenever a new service session starts. The entry would be removed when the session terminates, and the identifier would be freed for reuse. In the example implementation, the field is 2 octets, and the identifier is in hexadecimal value. It is obvious to anyone skilled in the art that other type of identifier supported by the terminal could be used. The MT_ID field (304) and the Session_ID field (306) uniquely identify a service session at the Home Network Authorizer (103).

Figure 4:
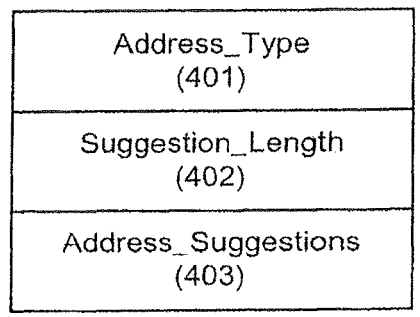
FIG. 4 is a data structure diagram showing an example of the message format of address allocation request used by the Mobile Terminal.

Address_Request field (307) contains the information about the address allocation request from the Mobile Terminal (101). In the example implementation, a compound structure is used, as shown in FIG. 4. The first part of the structure is the Address_Type field (401). This would identify which type of address is supported by the Mobile Terminal (101). The size of this field is one octet. Possible value could be:

No_IP::=0x00;
Single_Stack_IPv4::=0x01;
Single_Stack_IPv6_FullAddress::=0x02;
Single_Stack_IPv6_Prefix::=0x03;
Dual Stack_IPv4_Preferred::=0x04;
Dual Stack_IPv6_Preferred_FullAddress::=0x05;
Dual Stack_IPv6_Preferred_Prefix::=0x06

It is obvious to any one skilled in the art that there could be more types supported, and other numbers used. The second part of the structure is the Suggestion_Length field (402). This field indicates the length of the following field, Address_Suggestions field (403). The Address_Suggestions field (403) lists out the address that the Mobile Terminal (101) desires to be assigned. For example, an ongoing session is using a certain address, it would be important to have the same address assigned to keep the session uninterrupted. The Address_Suggestions field (403) could be a list of addresses. Each entry in the list starts with a one-octet type field stating the address type, e.g. IPv4, or IPv6, and followed by the actual address. For Home Network Authorizer (103) that does not support the terminal address suggestion feature, the Suggestion_Length field (402) and Address_Suggestions field (403) would be silently ignored.

After the Address_Request field (307) is the Tunnel_Request field (308). This field is used by the Mobile Terminal (101) to indicate which type of tunnel it supports. The first octet of the field indicates the length of this field, including itself. The content of this field could be a list, with each entry occupying two octets. The first octet of each entry contains the identifier of the tunnel type the Mobile Terminal (101) supports. The value of the octet could be:

Network Tunnel—Generic::=0x01;
Network Tunnel—Mobile IPv4::=0x02;
Client Tunnel—Generic::=0x04
Client Tunnel—Mobile IPv4::=0x05;
Client Tunnel—Mobile IPv6::=0x06;
No Tunnel::=0x08

It is obvious to anyone skilled in the art that other tunnel types could be defined and used in the field. The second octet of each entry indicates the direction of the tunnel. Possible value of this octet could be:

Tunnel—From terminal::=0x01;
Tunnel—To terminal::=0x02;
Tunnel—Bi-directional::=0x03;

The first entry in the list indicates the Mobile Terminal (101)'s preferred type.

The next field in the MT_Request_A message (202A) is the WLAN_ID field (309). It contains the information to identify the WLAN to the Home Network Authorizer (103), so that it could make decisions based on the location, or provide location-based service to the Mobile Terminal (101). The WLAN_ID could be obtained from the authentication procedures, or from the broadcasted information from the Access Point (105), e.g. the SSID in IEEE802.11 network. A Mobile Terminal (101) local identifier is also included. This is for the Access Point (105) to identify the terminal.

The last field is the Security_Field (310). This field contains the information to protect the message. The exact algorithm used for the field is negotiated between the Mobile Terminal (101) and its Home Network Authorizer (103). This could be settled at the user subscribing time, or saved into the SIM or USIM card of the terminal. It could also be implemented as software module, and to be downloaded whenever necessary.

The fields in the MT_Request_A message (202A) may not need to follow the exact sequence as described above. For example, in real implementation, the fields (304) to (309) could be placed in any order as long as they place a field identifier in the front.

In real implementation, the message could be carried over the link (1011) using any suitable mechanism. For example, in an IEEE802.11 network, it could be implemented as an EAP message, and use the EAPOL defined in IEEE802.1x to carry (non-patent reference 14).

When the Access Point (105) received this message, it would retrieve the home domain information from the Domain_Name field (303). The Access Point (105) could obtain the Home Network Authorizer (103)'s address using the domain information, e.g. make a DNS enquiry. The Access Point (105) would forward the message to the corresponding Home Network Authorizer (103) according to this information. In a certain case, the WLAN would have a central AAA server, the Access Point (105) would forward the message to the AAA server directly, and the WLAN AAA server would parse the domain information, and forward the message to the actual Home Network Authorizer (103). It is assumed that between the Access Point (105) and the Home Network Authorizer (103), a secure link exists. This could be setup during the authentication procedure (201), or dynamically setup using the security association derived from that process.

The Access Point (105) need not participate in the message processing, and therefore need not to implement the whole stack to parse the message. It would only need to read the message type, and do the re-encapsulation and forwarding, shown as the step of MT_Request_B message (202B). The protocol used for the forwarding could be any suitable AAA protocol (e.g. the EAP application for Diameter (non-patent reference 15) or NASREQ application for Diameter (non-patent reference 16)). Those protocols are already available on the Access Point (105) for the purpose of authentication. Therefore, the MT_Request_A message (202A) is essentially sent end-to-end from Mobile Terminal (101) to the Home Network Authorizer (103), similar to the end-to-end authentication procedure (201).

Figure 5:
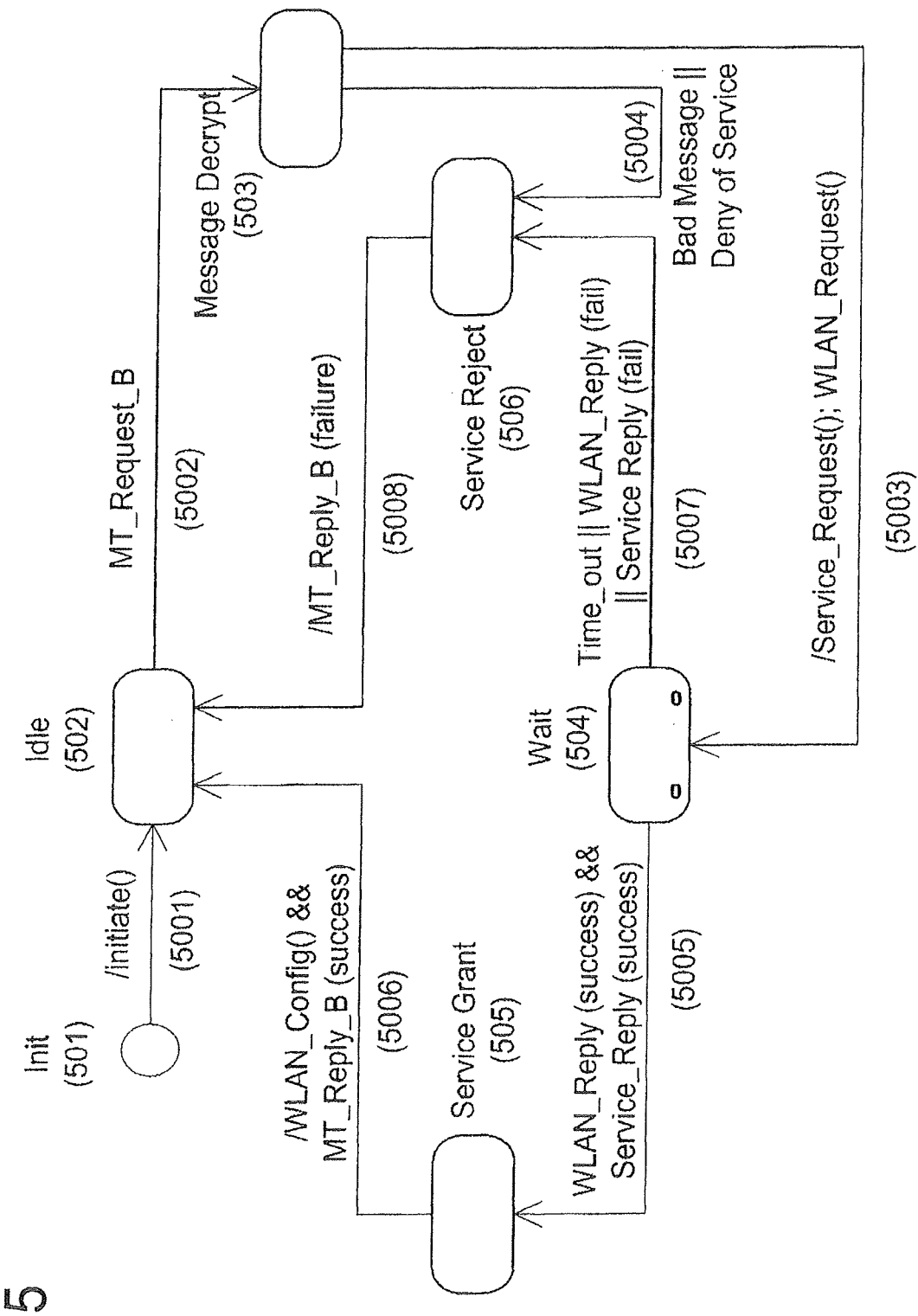
FIG. 5 is a state transition diagram showing an example implementation of the Home Network Authorizer in the framework shown in FIG. 1 for the Mobile Terminal address allocation, tunnelling setup and service negotiation in the WLAN inter-working in the present invention.

FIG. 5 shows an example implementation of the Home Network Authorizer (103)'s state machine. The Home Network Authorizer (103) starts from the Init state (501) to the Idle state (502), performing the process Initiate( )) in the transition (5001). The Initiate( ) process includes any necessary steps to establish connections with other backend servers, security associations, etc. It is obvious to anyone skilled in the art that other process could be involved depending on the setting in the real implementation.

Figure 6:
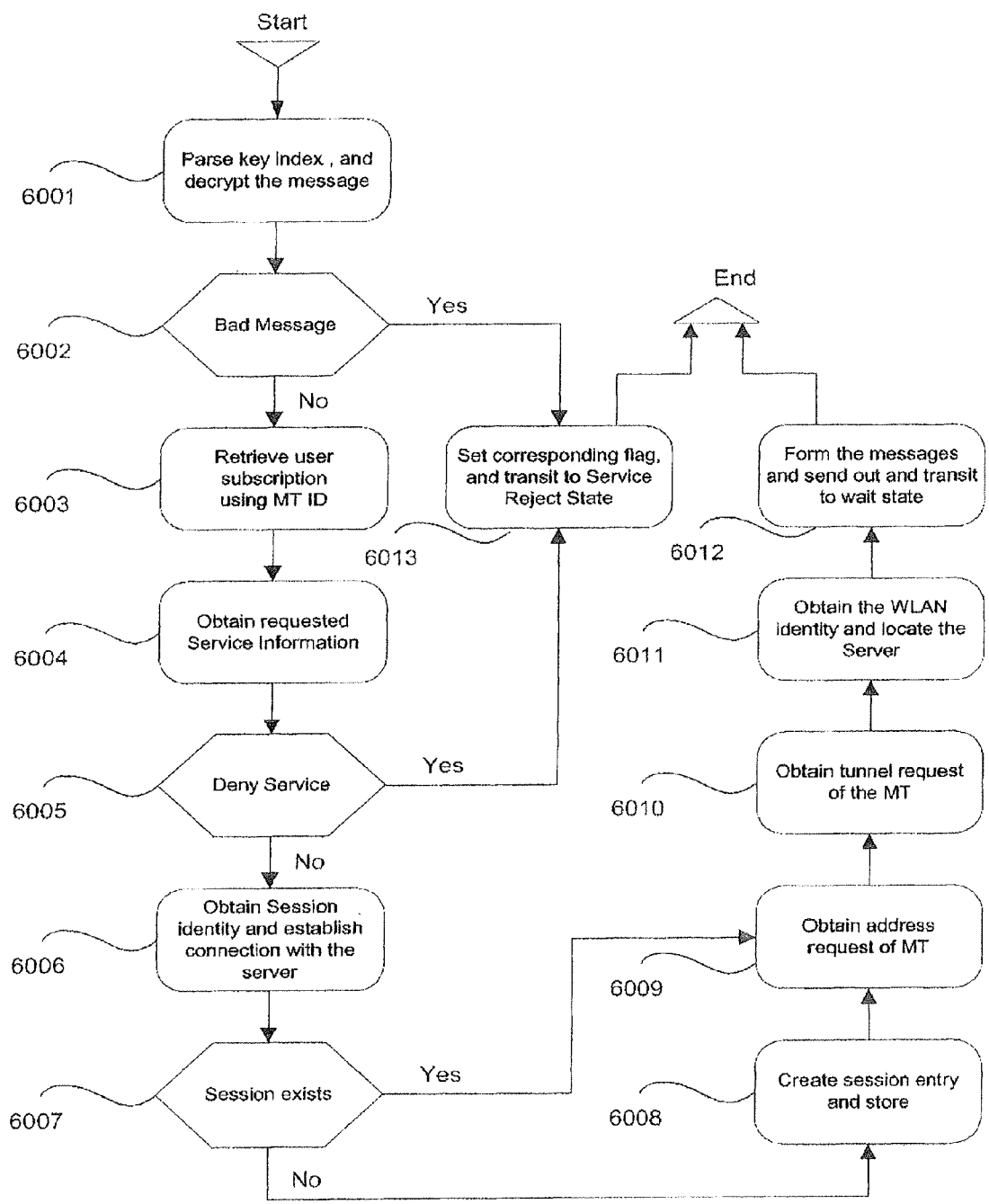
FIG. 6 is a flow chart showing an example of the flow chart that could be used for implementation of the request message processing procedure at the Home Network Authorizer.

When the Home Network Authorizer (103) received the MT_Request_B message (202B) forwarded from the Access Point (105) in the transition (5002), it would transit to the state Message Decrypt (503). FIG. 6 shows an example of the implementation of Message Decrypt (503) state. In the Message Decrypt (503) state, the Home Network Authorizer (103) would decrypt the fields in the MT_Request_B message (202B) using the keys identified by the Domain_Name field (303) field in step (6001). If the message is damaged, or detected modified using the Security_Field (310), in step (6002), the Home Network Authorizer (103) would set the flag to Bad Message in step (6013), and the state machine would transit to Service Reject state (504) in the transition (5004).

From the MT_Request_B message (202B), Home Network Authorizer (103) is able to gain the information about the identity of the terminal from the MT_ID field (304) in step (6003). Using the identity, Home Network Authorizer (103) would retrieve the user's subscription information from its database or a backend server (e.g. HSS in 3GPP network). The Home Network Authorizer (103) would also parse the service request information obtained from the Service_Request field (305) in step (6004). The service request could include various service specific information embedded, e.g. the bandwidth, delay, jitter, etc. Decision would be made in the Home Network Authorizer (103) using the user subscription information on whether to deny the service to the user in step (6005). If the service requested is not supposed to be granted based on the user's subscription, the Home Network Authorizer (103) would set the flag to Deny of Service in step (6013), and the state machine would transit to Service Reject state (504) in the transition (5004). If the service is permitted, the Home Network Authorizer (103) would search its records for the terminal of the service for the session identifier, received in the Session_ID field (306) in step (6007). If a record exists with the same session identifier, it means this is a handover request, and the terminal should be allocated the same address, so that the service session would not be interrupted. If no record exists, it means it is a new request, and a record entry should be generated in step (6008), and stored in the Home Network Authorizer (103)'s storage, or update the backend database, e.g. the HSS. The Home Network Authorizer (103) would also identify the Service Provider Network (1003) using the service information, and a connection would be setup with the Service Provider Network Server (104).

From the Address_Request field (307), the Home Network Authorizer (103) obtains the address the Mobile Terminal (101) desires to use in step (6009). If the Home Network Authorizer (103) does not wish to support this function due to operator policy or anything else, it can silently ignore this information. The Mobile Terminal (101) should always use the final address allocated from the Home Network Authorizer (103). The Home Network Authorizer (103) would decide from the service requested whether the address should be allocated locally or in the Home Network (1002), or in the Service Provider Network (1003). For example, if a user is only allowed to use the WLAN local service, the address should be allocated inside the WLAN, while for a user subscribed to a VPN service, it should be allocated with an address in that VPN.

The Home Network Authorizer (103) retrieves the tunnel type supported by the Mobile Terminal (101), from the Tunnel_Request field (308) in step (6010). This information would be used to set up the tunnels for the service provisioning. The Mobile Terminal (101) could list out more than one tunnel type, and the first one in the list is the preferred type. The Home Network Authorizer (103) needs to check with the Service Provider Network Server (104), and decide which type to use. Extra information, for example the direction of the tunnel, could also be included.

From the WLAN_ID field (309), the Home Network Authorizer (103) would get the identity of the Wireless LAN that the Mobile Terminal (101) is currently associated with in step (6011). Using this information, the Home Network Authorizer (103) would locate the corresponding WLAN Management Server (102). This could be stored in the Home Network Authorizer (103)'s database as part of the roaming agreement, or be retrievable from the backend server (e.g. HSS). A secure link would be established after the server information is obtained. This link is used for the following service message signaling.

After obtained all the information, the Home Network Authorizer (103) would form the Service_Request message (203) and the WLAN_Request message (205). This message would be sent out when the state machine of the Home Network Authorizer (103) transits to the Wait State (504).

Figure 7:
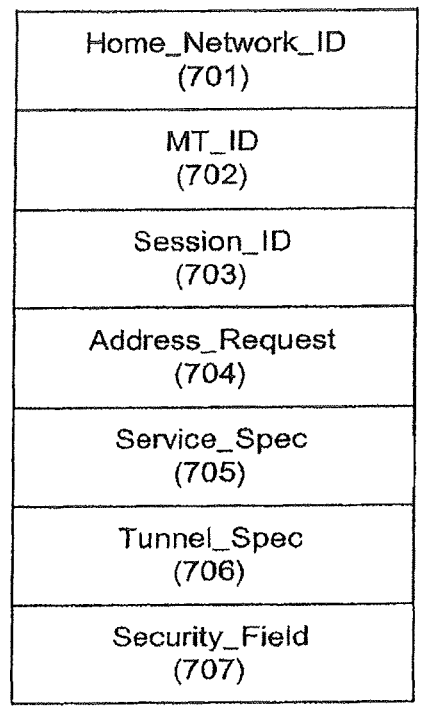
FIG. 7 is a data structure diagram showing an example of the message structure used by Home Network Authorizer for negotiating Mobile Terminal service specification, address allocation and tunnel settings with Service Provider Network Server.

FIG. 7 shows an example of the implementation of the Service_Request message (203). The message starts with the Home_Network_ID field (701). This field contains the information about the Mobile Terminal (101)'s home network identifier. It could be an operator's name, or a sub-system of a big network. The identifier should be globally unique. DNS name of the network, e.g. "network.operator.3gpp.org", is a good candidate for this identifier. The presence of the home network information enables the Service Provider Network Server (104) to apply network policies, e.g. roaming agreements, to the service request. The user profiles are managed by the Home Network (1002), and therefore the user information should not be sent to the Service Provider Network Server (104). However, to enable finer control of the service, user priority/grouping information could be attached to the message. This could be concatenated with the home network identifier, e.g. "goldmember.network.operator.3gpp.org". The Service Provider Network Server (104) could use this to differentiate the user when granting services.

The next field is the MT_ID field (702). This field contains the information about the Mobile Terminal (101)'s identifier. It is used by the Home Network Authorizer (103) for service tracking The identifier could be the terminal's IMSI, or a temporary ID allocated by the Home Network Authorizer (103) specific for the service session. It should be consistent for the whole lifetime of the service session.

A Session_ID field (703) follows the above field. It is the session identifier allocated by the terminal. The Service Provider Network Server (104) should keep a record of all the on-going session information. Therefore, when the session identifier exists in the database, it means the service request is triggered by a handover, and therefore should use the same configurations to avoid service interruption. For example, when a session is active, the Service Provider Network Server (104) should allocate the same address for the Mobile Terminal (101), so that the communication with the correspondence node can continue without any signaling.

The Address_Request field (704) is similar to that in the MT_Request_A message (202A). This part indicates to the Service Provider Network Server (104) the type of address to allocate, e.g. IPv6. Similar to the Address_Request field (307) of the MT_Request_A message (202A), it also provides address requested by the Mobile Terminal (101). If the Service Provider Network Server (104) does not want to support this function, it could ignore this information. If the Home Network Authorizer (103) decides the address needs not to be allocated from the Service Provider Network (1003), this field would be omitted.

The Service-Spec field (705) is a compound field. It contains the information of the specific requirements from the Home Network Authorizer (103) based on the user's subscription. A possible implementation (Data Structure 1) of this field is shown below.

```
struct Service_Spec {
    u_long bitrate_avg;
    u_long bitrate_max;
    int deliver_order;
    int MTU_size;
    double delay;
    double jitter;
    int priority;
    int service_direction;
    int QoS_type
    struct timeval start_time;
    struct timeval end_time;
};
```

Among the attributes, bitrate_avg and bitrate_max represent the guaranteed and maximum bit-rate for the service requested. The deliver_order attribute indicates whether the deliver is required to be in order. The MTU_size specifies the maximum data unit size to be transferred for the service. The delay and jitter fields specify some basic QoS attributes for the service. The priority attribute indicates the handling priority of the data traffic for this service. The service_direction attribute indicates whether the service is uni-directional or bi-directional. The QoS_type attribute specifies the QoS schemes to be used for provisioning the service, e.g. DiffServ, or InterServ with RSVP, etc. The start_time and end_time specify the starting and ending time of the service. The Service Provider Network Server (104) could use this information to schedule the resources for the service. It is obvious to anyone skilled in the art that other service specific attributes could be included in the structure in real implementation.

After the Service_Spec field (705) is the Tunnel_Spec field (706). This field contains the tunnel information, and is similar to the Tunnel_Request field (308) of the MT_Request_A message (202A), but with some extra information attached. For example, for the network tunnel entry, the WLAN end point is provided, and for the terminal tunnel, a security key could be attached for data encryption.

The last field of the Service-Request message (203) is the Security_Field (707). This field is used to protect the whole message using the security association between the Home Network Authorizer (103) and Service Provider Network Server (104). The exact algorithm used for this is implementation dependent.

It is obvious to anyone skilled in the art that the fields in the Service_Request message (203) need not to be the described order. In real implementation, the Home Network Authorizer (103) and Service Provider Network Server (104) could negotiate any suitable order for the optimization of signaling.

After the Service Provider Network Server (104) received the Service_Request message (203), it would carry out the Service Address Management procedure (204). In this procedure, the Service Provider Network Server (104) would search its database for the session identifier contained in the Session_ID (703). If the session identifier for the same Mobile Terminal (101), exists Service Provider Network Server (104) copies all the information in its record, e.g. address of the MT, specification of the service, etc, and send that back to the Home Network Authorizer (103) as the reply message directly.

If the session identifier does not exist, the Service Provider Network Server (104) would create a new entry using the new session identifier as index in its database. The Service Provider Network Server (104) would check the Address_Request field (704), and allocate a suitable address for the Mobile Terminal (101) based on the address type specified in this field.

The Service Provider Network Server (104) checks the Service_Spec field (705) from the Home Network Authorizer (103). If the requested service is not supported, a message which indicates failure would be sent back to the Home Network Authorizer (103). Some error code could be used to specify the cause of the failure. If certain attributes in the Service_Spec field (705) exceed the current capability of the Service Provider Network (1003), the Service Provider Network Server (104) would try to negotiate with the Home Network Authorizer (103) for a new set of attributes. This could be achieved by having the same Service_Request message (203) sent back to the Home Network Authorizer (103) with the Service_Spec field (705) modified to proposed value by the Service Provider Network Server (104).

The Service Provider Network Server (104) checks the Tunnel_Spec field (706) for the matched tunnel type. There could be multiple matches, but the Service Provider Network Server (104) should choose the first match. For a Network Based Tunnel type, the Service Provider Network Server (104) needs to prepare the tunnel end points information in the reply message. For the Client Based Tunnel, the Service Provider Network Server (104) would prepare tunnel type specific information, and include that in the reply information. For example, for a Mobile IPv6 type of scheme, the Service Provider Network Server (104) needs to assign a Home Agent for the Mobile Terminal (101), and include possible some security information in the reply message too. Directional information, e.g. uni-direction, bi-direction, would also be attached to the tunnel information fields.

The Service Provider Network Server (104) replies to the Home Network Authorizer (103) with the Service_Reply message (205). The Service_Reply message (205) could use the same structure as the Service_Request message (203) as shown in FIG. 7. The contents of the Home_Network_ID (701), MT_ID (702) and Session_ID (703) fields are copied directly from the corresponding Service_Request message (203). These fields would be used by the Home Network Authorizer (103) to match the request and reply message pair when the signaling link is reused for multiple terminals.

The content of the Address_Request field (704) field in the Service_Reply message (205) contains the address(es) allocated to the Mobile Terminal (101). It could be a list of address entries with the first octet indicating the length of the field in byte. The following part of the field is the address list, with one octet indicating the address types followed by the actual address. Wildcard address is allowed. For example, if the address field is filled with all zero, it is indicating the Mobile Terminal (101) forms an address using WLAN local mechanisms (e.g. IPv6 auto-configuration) (non-patent reference 17) or DHCP.

The content of the Service_Spec field (705) in the Service_Reply message (205) contains the attributes agreed by the Service Provider Network Server (104). It is identical to the Service_Spec field (705) in the corresponding Service_Request message (203), if all the attributes are approved by the Service Provider Network Server (104). Otherwise, it is the counter proposal of the Service Provider Network Server (104) to the Home Network Authorizer (103).

The Tunnel_Spec field (706) in the Service_Reply message (205) contains the tunnel setting chosen by the Service Provider Network Server (104). The exact content of this field is tunnel type specific. If a Client Based Tunnel type were chosen, only one setting is necessary. For example, if the Mobile IPv6 were agreed, the field would contain the address of the Home Agent assigned to the Mobile Terminal (101), and a security key for Binding Update authentication, etc. The address in the Address_Request field (704) would be used as the home address of the Mobile Terminal (101). If Network Based Tunnel type is chosen, the field would contain, for example, the end-point address, tunnel identifier, etc, and all the necessary details for each supported tunnel type.

Figure 8:
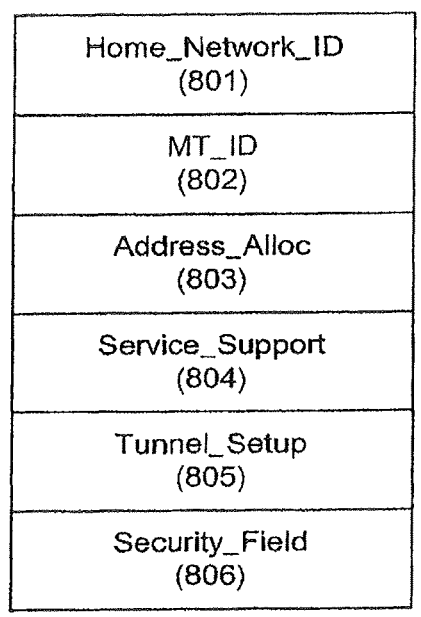
FIG. 8 is a data structure diagram showing an example of the message structure used by Home Network Authorizer for negotiating Mobile Terminal service specification, address allocation and tunnel settings with WLAN Server.

In parallel with the Service_Request message (203), the Home Network Authorizer (103) would send a WLAN_Request message (206) to the WLAN Server (102). This message negotiates the necessary setting for provisioning service in the WLAN. An example of the implementation of this message is shown in FIG. 8.

The WLAN_Request message (206) contains two similar fields, Home_Network_ID field (801) and MT_ID field (802), as the Service_Request message (203). The Home_Network_ID field (801) contains the identifier of the subscriber's home network. It is passed to the WLAN Server (102) in case some network policy would apply to the service provisioning. The MT_ID field (802) is used to track the location of the Mobile Terminal (101). It could be, for example, the Access Point identifier concatenated with the Mobile Terminal (101)'s lower layer identifier, e.g. MAC address.

The Address_Alloc field (803) is a flag to indicate whether a WLAN local address needs to be allocated for the Mobile Terminal (101), and the address types to be used. The Home Network Authorizer (103) would decide whether the local address is necessary based on the tunnel scheme chosen. In the example implementation, the first octet of this field indicates whether allocation is necessary with the following definition:

No_Allocation::=0x00;
Single_Stack_IPv4::=0x01;
Single_Stack_IPv6_FullAddress::=0x02;
Single_Stack_IPv6_Prefix::=0x03;
Dual_Stack_IPv4_Preferred::=0x04;
Dual Stack_IPv6_Preferred_FullAddress::=0x05;
Dual Stack_IPv6_Preferred_Prefix::=0x06

It is obvious to anyone skilled in the art that other values could be used in the real implementation of this message.

The Service-Support field (804) is a compound field that includes all the necessary attributes to support the service provisioning in the WLAN. The actual content is service specific. An example content of this field is as that described in Data Structure 1.

The Tunnel_Setup field (805) is also a compound field. It uses the similar format as the Tunnel_Spec field (706) in the Service_Request message (203).

The last field of the WLAN_Request message (206) is the Security_Field (806). This field is using the security association to protect the integrity of the whole message. Algorithm used for the computation of this field is implementation dependent.

The WLAN Server (102) would carry out the WLAN Service Address Management (207) after receiving the WLAN_Request message (206). For example, if the local IPv6 address allocation were requested by the Home Network Authorizer (103), the WLAN Server (102) would locate the suitable network section and allocate the IPv6 address for the terminal. If necessary, the WLAN Server (102) would also update the gateway, or firewall of the WLAN of the new address allocation, so that the Mobile Terminal (101) is able to access the service using this allocated local address.

The WLAN Server (102) would also use the information in the Service_Support field (804) to perform local admission control. Similar to the Service Provider Network Server (104), if a certain attribute exceeds the WLAN's current capacity, the WLAN Server (102) would try to negotiate a new set of service specification with the Home Network Authorizer (103), e.g. reduce the bit rate, change the service time interval, etc.

If a Client Based Tunnel scheme is chosen by the Home Network Authorizer (103), the WLAN Server (102) does not need do any special setup. When the Network Based Tunnel scheme is used, the WLAN Server (102) needs to identify the tunnel end points using the information from the MT_ID field (802).

The WLAN Server (102) replies the WLAN_Request message (206) with the WLAN_Reply message (208). The WLAN_Reply message (208) uses the similar structure as the WLAN_Request message (206), as shown in FIG. 8. The Home_Network_ID field (801) and MT_ID field (802) are copied directly from the corresponding WLAN_Request message (206). These fields are used by the Home Network Authorizer (103) to match the request and reply message pair.

The Address_Alloc field (803) in the WLAN_Reply message (208) contains the information of the WLAN local address allocated to the Mobile Terminal (101). The first octet of the field indicates the type of the address, as defined for Address_Request field (307) in MT_Request_A message (202A). The following part of the field contains the actual address allocated for the Mobile Terminal (101). For example, if an IPv6 address is allocated, the first octet would be 0x02, and the next 32 octets contain the actual IPv6 address.

The Service_Support field (804) in the WLAN_Reply message (208) contains the information of the service attributes as defined for the WLAN_Request message (206). If these service attributes were acceptable by the WLAN, WLAN Server (102) would copy them directly from WLAN_Request message (206). If WLAN Server (102) could not agree on the attributes, it would send a new proposal in the WLAN_Reply message (208) with attributes set to new values.

The Tunnel_Setup field (805) in the WLAN_Reply message (208) is the tunnel information for the Mobile Terminal (101). It specifies the tunnel type to be used in the first octet, and the tunnel type specific data in the following octets. For example, if Mobile IPv6 is used for the data traffic, only one tunnel type is present in this field, and address in the Address_Alloc field (803) would be used as the care-of-address of the Mobile Terminal (101). If Mobile IPv4 is used, this field would contain the tunnel type in the first octet followed by the Foreign Agent address allocated to the Mobile Terminal (101).

The Home Network Authorizer (103) would consolidate the information from the WLAN Server (102) and the Service Provider Network Server (104) after receiving the Service_Reply message (205) and WLAN_Reply message (208). If the Service_Spec field (705) or Service_Support field (706) contains different attribute values than that in the Service_Request message (203) or WLAN_Request message (206), renegotiation of service specification is necessary. The Home Network Authorizer (103) would check the new values proposed by the Service Provider Network Server (104) or the WLAN Server (102). If these new values were acceptable, it would confirm the new setting using the SPN_Config message (210) and WLAN_Config message (211).

The message pairs Service_Request message (203), Service_Reply message (205) and WLAN_Request message (206), WLAN_Reply message (208) do not have time correlation. They could happen in parallel, or one after another depending on the implementation of the Home Network Authorizer (103). For example, the Home Network Authorizer (103) could decide to send out the WLAN_Request message (206) instead of Service_Request message (203) if the connection with the WLAN Server (102) is idle.

The SPN_Config message (210) is sent by the Home Network Authorizer (103) to the Service Provider Network Server (104) to confirm the new service parameters if a renegotiation is needed. Same message format as the Service_Request message (203) is used for the SPN_Config message (210). Some fields (e.g. the Address_Request) would be omitted if not used.

Tunneling information could also be attached if necessary. For example, when Client Based Tunnel (e.g. Mobile IP) is used, the care-of-address of the Mobile Terminal (101) allocated by the WLAN Server (102) would be inserted to the Tunnel_Request field (308). If a Network Based Tunnel is used, the tunnel end-point address, port number, etc, of the WLAN would be forwarded in this message.

The WLAN_Config message (211) serves the similar purpose. The Home Network Authorizer (103) uses this message to confirm new settings with the WLAN Server (102) if necessary. The message could also be used for forwarding tunnel information. For example, when the Network Based Tunnel is used, the tunnel end point address, port number, etc, of the Service Provider Network (1003) would be forwarded to the WLAN Server (102) in this message. WLAN Server (102) would then instruct the corresponding nodes to set up the tunnel. When the Client Based Tunnel is used, the terminal address would be included in the message, so that the WLAN could open the firewall for the data traffic.

It is obvious to anyone skilled in the art that these two messages, SPN_Config message (210) and WLAN_Config message (211) could be used by the Home Network Authorizer (103) to revoke the resources allocated for the Mobile Terminal (101) when the service session is over. For example, when the Home Network Authorizer (103) detected that the Mobile Terminal (101) is no longer in the WLAN, it would issue a WLAN_Config message (211) with Service_Support field (804) set to all zero. After receiving this kind of message, WLAN Server (102) would free all the resources allocated to the Mobile Terminal (101), and perform other appropriate actions.

The Home Network Authorizer (103) would send an MT_Reply_B message (212B) as the reply to the MT_Request_B message (202B). This message would be forwarded by the Access Point (105) or any other attendant, to the Mobile Terminal (101) as the MT_Reply_A message (212A). The MT_Reply_A message (212A) and MT_Reply_B message (212B) have the identical contents and format. Network Elements between the Home Network Authorizer (103) and Mobile Terminal (101) has no access to the contents of these messages, and the Access Point (105) would only re-encapsulate the whole message and forward it. The MT_Reply_A message (212A) or MT_Reply_B message (212B) is encrypted with the security association shared between the Mobile Terminal (101) and Home Network Authorizer (103). Since the MT_Reply_A message (212A) is the reply to the corresponding MT_Request_A message (202A), the Access Point (105) would know which Mobile Terminal (101) to forward.

If the WLAN Server (102) is on the path of the MT_Reply_B message (212B), the WLAN_Config message (211) could be piggybacked to the same message. For example, if the WLAN Server (102) were the AAA server using Diameter in the WLAN that would forwards the MT_Reply_B message (212B) to the Mobile Terminal (101), the MT_Reply_B message (212B) could be encapsulated in the Diameter-EAP-Answer AVP, while WLAN_Config message (211) being encapsulated in another AVP in the same message. It is obvious to anyone skilled in the art that same kind of scheme could be used even other transportation protocol is utilized.

The MT_Reply_A message (212A) has the same structure as the MT_Request_A message (202A), as shown in FIG. 3. The Message_Type field (301) has the same format as that of the MT_Request_A message (202A). It would use an integer to indicate that this message is a Reply instead of Request. The Message_Length field (302) indicates the total length of the message including the Message_Type field (301). The Domain_Name field (303) and the MT_ID field (304) in the MT_Reply_A message (212A) are the same as those in the MT_Request_A message (202A). It is obvious to anyone skilled in the art that these fields could be omitted in the real implementation for signaling optimization.

The Service_Request field (305) in the MT_Reply_A message (212A) is used to contain the service specific information set by the Home Network Authorizer (103) based on the user's subscription. For example, if a user requested for the IMS service, this could be the P-CSCF address. It is obvious to anyone skilled in the art that other information necessary to the service provisioning could be included in this field. The exact format of this field is service dependent.

The Session_ID field (306) in the MT_Reply_A message (212A) is copied directly from the MT_Request_A message (202A). It could be omitted in the real implementation if not required by the Mobile Terminal (101).

The Address_Request field (307) in the MT_Reply_A message (212A) contains the address allocated to the Mobile Terminal (101). It should be used by the service application as the source address. First octet of this field is the address type, and followed by the actual address. For example, if an IPv6 address prefix was allocated, the first octet would be 0x03, and the following 32 octets contains the prefix information to be used by the Mobile Terminal (101) to form the actual IPv6 address. Other address information, e.g. WLAN gateway address or DNS server address, could also be included. These attributes would follow the address information described above. Wildcard value of all zero indicates that the Mobile Terminal (101) should use local stateless mechanism to obtain the actual information.

The Tunnel_Request field (308) in the MT_Reply_A message (212A) contains the tunneling setting for accessing the service requested by the Mobile Terminal (101). It would be tunnel type dependent. The first octet of this field indicates the tunnel types used.

For example, if Client Based Tunnel type Mobile IPv6 were used, the value would be 0x06, as defined for the tunnel types in the MT_Request_A message (202A). Following the type attribute, there would be the care-of-address allocated by the WLAN, and the Home Agent address, and the security keys if necessary. The address in the Address_Request field (307) would be the Home Address allocated to the terminal.

If a Network Based Tunnel type were used, following the type attribute, there would be the address of the local endpoint of the tunnel, and the security keys for the Mobile Terminal (101) to securely communicate with the end-point.

The WLAN_ID field (309) in the MT_Reply_A message (212A) is copied directly from the MT_Request_A message (202A). It could be omitted in real implementation for optimization of the signaling.

The Security_Field (310) of the MT_Reply_A message (212A) is used for protect the integrity of the whole message. It uses the security association between the Mobile Terminal (101) and Home Network Authorizer (103). It should use the same algorithm as that for the MT_Request_A message (202A).

After receiving the MT_Reply_A message (212A), the Mobile Terminal (101) would retrieve all the necessary information, and configure accordingly. The Mobile Terminal (101) could start the actual service session (213) using the setting.

In real implementation, a Mobile Terminal (101) could request for a few service at the same time, e.g. a Voice-over-IP session together with a video streaming session. This would involve different Service Provider Network in the signaling. Same mechanism and message structure described above could be used in the scenario by aggregating several service requests in the same message. For example, in the MT_Request_A message (202A), there could be multiple sets of fields; Service_Request field (305), Session_ID field (306), Address_Request field (307) and Tunnel_Request field (308). These four fields would be grouped, and for each service requested by the Mobile Terminal (101), one group of these four fields would be included. For example, a MT_Request_A message (202A) requesting for a voice-over-IP session and a video streaming session, two groups of the listed four fields would be present.

After receiving the MT_Request_B message (202B) that contains the same contents as the MT_Request_A message (202A), the Home Network Authorizer (103) retrieves information from each set of these four fields corresponding to one specific service requested by the Mobile Terminal (101). Home Network Authorizer (103) would perform signaling for each of the requested services as described above for the single service request. For example, the Home Network Authorizer (103) would send Service_Request message (203) to both the IMS sub-system and the network which provides the streaming service. While for the WLAN_Request messages (206) for different services, they are destined for the same WLAN. The Home Network Authorizer (103) could be aggregate the information, and send only one message. If multiple WLAN_Request messages (206) need to be sent to the same WLAN, only one of them needs to request for the local address allocation.

The Home Network Authorizer (103) would aggregate all the service information into one MT_Reply_B message (212B) according to the order of the service requested, and forward that to the Mobile Terminal (101) through the Access Point (105). Mobile Terminal (101) could then configure itself using the information in the aggregated MT_Reply_A message (212A).

If the Mobile Terminal (101) requests multiple services in parallel, it is possible that different addresses are allocated to the terminal from different Service Provider Networks. It is also possible that different tunnels are setup for different service sessions. In this scenario, a special mid-layer processor is required. The service session identifier, as used in the Session_ID field (306) would be used by the mid-layer processor to multiplexing the address and tunnel setting.

The mid-layer processor in the Mobile Terminal (101) would maintain a local database of the address and tunnel information for different service sessions. When a service session is generated at the Mobile Terminal (101), the mid-layer processor would create an identifier for it. This is the session identifier that would be used in the Session_ID field (306) of the MT_Request_A message (202A). After receiving the MT_Reply_A message (212A) that contains all the address and tunnel information, the mid-layer processor would create a new entry in its database which contains all the information indexed by the session identifier. When a service application needs to initiate a new connection session, it sends the request with the session identifier to the mid-layer processor. The mid-layer processor would retrieve corresponding address and tunnel information from its database using the session identifier. The address and tunnel information would be used by the normal stack, e.g. IP layer, to create suitable binding, e.g. socket, for the connection.

It is obvious to anyone skilled in the art that in real implementation, there could be WLAN that has no controller, i.e. no WLAN Server (102). In this case, the Mobile Terminal (101) has to use those WLAN local mechanisms for address allocation and tunnel setup. The Home Network Authorizer (103) would set the Address_Request field (307) and Tunnel_Request field (308) in the MT_Reply_A message (212A) to all zero, this would force the Mobile Terminal (101) to use WLAN mechanism, e.g. DHCPv6, MIPv6, etc, to configure the address.

In a certain case, the Mobile Terminal (101) would desire to cancel the service registration in the WLAN. It is obvious to anyone skilled in the art that the above-described mechanism could also be used to de-register the service. The Mobile Terminal (101) could send out a MT_Request_A message (202A) with Service_Request field (305) set to a special value indicating the terminating of service. For example, the Service_Request field (305) could include a value as "terminate.request.IMS.foo.bar.operator-name.operator-group.gprs". The "terminate" before the "request" keyword is the flag to terminate the service indicated by the APN attached after the "request" keyword. The Session_ID (306) field of the MT_Request_A (202A) message would be set to the session identifier of the service to be terminated. The Address_Request (307) and Tunnel_Request (308) fields could be omitted for this type of MT_Request_A message (202A).

The Home Network Authorizer (103) processes the MT_Request_A (202A) message as normal. When it found the "terminate" keyword in the Service_Request (305) field, it would retrieve the service session identifier from the Session_ID (306) field. The Home Network Authorizer (103)

would search its database for the session entry created at service registration time. This session entry would store the information about the settings of the service, e.g. the address allocated, the tunnel setting, etc. Using the information, the Home Network Authorizer (103) would send Service_Request (203) message to the Service Provider Network Server (104), and WLAN_Request (206) message to the WLAN Server (102) as normal. In these messages, the Service_Spec (705) field and Service_Support (804) are set to all zero.

The Service Provider Network Server (104) and WLAN Server (102) would process the message as normal. When they read the all zero Service_Spec (705) field or Service_Support (804) field, they would know it is a service termination request. These two servers would search their database for the service session entry created at the service registration time, and free corresponding resources, e.g. the IP address, reserved bandwidth, etc, for the service session.

A MT_Reply_A message (212A) would be sent back to the Mobile Terminal (101) after the Home Network Authorizer (103) received notification from Service Provider Network (1003) and the WLAN. This message is to notify the success terminating of the service, and free of the reserved resources. In this MT_Reply_A (212A) message, the Service_Request (305) contains the information about the result. For example, following value could be used in this field, "removed.request-.IMS.foo.bar.operator-name.operator-group.gprs", where the "removed" keyword before the "request" keyword indicates the success deregistration of the service. It is obvious to anyone skilled in the art that extra information could be included, e.g. appended after the "removed" keyword.

In the process of provisioning service to the Mobile Terminal (101), policy control would involve. For example, a terminal using its GPRS interface is allowed 149 Kbps access rate. When this terminal roams into a WLAN, it transits to use its WLAN interface for accessing the same service. Since the WLAN provides much higher air interface bandwidth, the terminal is expected to enjoy higher access rate (e.g. 1 Mbps). In order to achieve this higher service rate to the Mobile Terminal (101), policy control framework needs to be invoked to modify corresponding policy settings, e.g. gateway filters. In the above example, the control point, e.g. the GGSN would only reserve 149 Kbps bandwidth for the terminal's service when it initiates the service using the GPRS interface. When the Mobile Terminal (101) registers the service session again using the WLAN service, the policy server should modify the settings at the GGSN to the 1 Mbps. It is obvious to anyone skilled in that art that other kinds of setting and a control node would be involved in the policy control.

This kind of policy control should be based on the user's subscription, and therefore in the Home Network domain. The present invention uses the Home Network Authorizer (103) to handle the service request and address (tunnel setup). Therefore, it has all the necessary information for the policy control decision. This information could be passed by the Home Network Authorizer (103) to the Policy Server of the Home Network domain. The Policy Server could in turn use the policy control interface to manipulate the corresponding node, e.g. the GGSN, to act accordingly. The Policy Server could also inform other networks involved in the service provisioning using the policy control framework. For example, the Policy Server in the Home Network domain could inform the Policy Server in the WLAN of the new access rate limit, so that the WLAN Policy Server could adjust local admission control mechanism accordingly.

Figure 9:
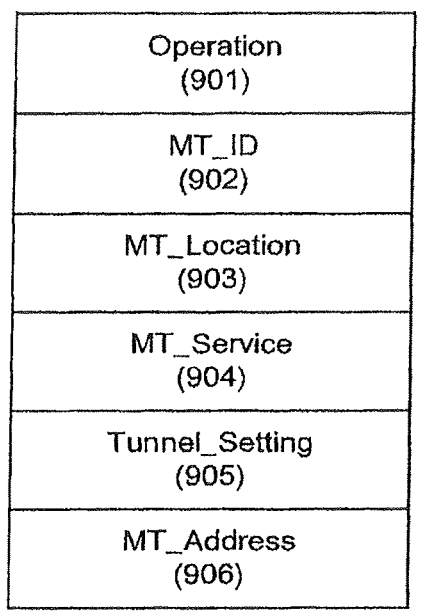
FIG. 9 is a data structure diagram showing an example of the message structure used by Home Network Authorizer for updating the Mobile Terminal's status in the policy server of the Home Network domain.

FIG. 9 shows an example implementation of the message used between the Home Network Authorizer (103) and the Policy Server. The message starts with the Operation field (901). This field indicates the operation to be taken by the Policy Server. Possible value could be:

Install::=0x01;
Remove::=0x02;
Update::=0x03;

When Home Network Authorizer (103) received a new service session request from the Mobile Terminal (101), it would use value "Install" in the Operation field (901). When Mobile Terminal (101) terminates a service session, the Home Network Authorizer (103) would use "Remove" value in the Operation field (901). The "Update" value would be used when the service request from the Mobile Terminal (101) is regarding an active service session. It is obvious to anyone skilled in the art that other types of value could be used in real implementation.

Second field is the MT_ID field (902). This field contains the identifier of the Mobile Terminal (101). For example, it could be the IMSI of the mobile user.

Third field is the MT_Location field (903). This field would be used by the Policy Server to retrieve location based service policy, e.g. provide double access rate when the terminal is a certain WLAN. This field could contain, for example, the WLAN identifier from the WLAN_ID field (309) in the MT_Request_A message (202A).

The next field is the MT_Service field (904). This field indicates what kind of service is accessed by the Mobile Terminal (101). It could also contain the service session information. An example of the content in this field could be the APN plus the session identifier.

The next field is the Tunnel_Setting field (905). This field indicates the tunnel setting used by the Mobile Terminal (101) in the WLAN. The contents of this field are the tunnel type followed the tunnel end point address, port number, etc. The exact format is tunnel type specific. The tunnel types used are the same as those defined for the Tunnel_Request field (308) field in the MT_Request_A message (202A).

The last field of the message is the MT Address field (906). This field contains the address used by the Mobile Terminal (101) in the WLAN. This could be used by the Policy Server to set the filtering rules for accessing the service.

It is obvious to anyone skilled in the art that in real implementation, the message fields need not follow the exact order as described above. Each field could also include extra information not described in the example in actual implementation.

INDUSTRIAL APPLICABILITY

The present invention provides a way for managing the address allocation of the terminal in WLAN inter-working. When it deployed, the mobile terminal could be allocated an address based on the service it requested and its subscription information. The address management could be carried out without requiring access to the local resources. The invention also provides a method for control the tunnel setup in the WLAN inter-working. With it, the mobile terminal could support either network based or client based tunnel setup together with the service authorization. This invention also provides a method for inter-working with the policy control framework. Using the interface provided, the service authorization, address allocation, and tunnel setting information could be propagated to the policy servers, and proper action could be taken to better deliver the service to the terminal. With all the methods, the address management, tunnel setup, and service authorization could be accomplished within one roundtrip message exchange between the terminal and its home domain server. Thus, precious signalling time and bandwidth could be saved.

The invention claimed is:

1. A network element, located in a cellular network, for allocating an address for a mobile terminal to access a service from a WLAN access network, the service being provided in the cellular network, the network element comprising:
an information processing device configured to receive a tunnel setup request message from the mobile terminal via the WLAN access network, the tunnel setup request message including a service request identifier for accessing the requested service and a mobile terminal identifier, and to allocate an address for use by the mobile terminal to access the requested service based on the service request identifier and the mobile terminal identifier.

2. The network element according to claim 1, wherein the information processing device is further configured to query a node in the cellular network or a node in an external network whether access for the requested service by the mobile terminal is allowed, based on user subscription information, after the information processing device receives the tunnel setup request message and before the information processing device allocates the address.

3. The network element according to claim 2, wherein the information processing device is further configured to receive the address from the node in the cellular network or the node in the external network being queried.

4. The network element according to claim 1, wherein the information processing device is further configured to perform Quality of Service (QoS) adjustment between the WLAN access network and a WLAN server that is connected to the network element.

5. The network element according to claim 4, wherein the information processing device is further configured to perform QoS adjustment via a policy server configured to perform policy control in the cellular network.

6. The network element according to claim 1, wherein the information processing device is further configured to send the allocated address to the mobile terminal.

7. The network element according to claim 1, wherein the cellular network is a 3GPP network.

8. A mobile terminal for accessing a service from a WLAN access network, the service being provided in a cellular network, the mobile terminal comprising: a transmitter configured to send a tunnel setup request message from the WLAN access network to a network entity which is located in the cellular network, the tunnel setup request message including a service request identifier for accessing a requested service.

9. The mobile terminal according to claim 8, further comprising a computer configured to obtain an address of the network entity based on information on the cellular network.

10. The mobile terminal according to claim 8, further comprising a receiver configured to receive from the network entity an address for accessing the requested service, the address being based on the service request identifier and the mobile terminal identifier.

11. The mobile terminal according to claim 8, wherein the tunnel setup request message includes a mobile terminal identifier.

* * * * *